United States Patent [19]

Kassai

[11] 4,431,145
[45] Feb. 14, 1984

[54] EMERGENCY LOCKING DEVICE FOR SAFETY BELT RETRACTOR

[75] Inventor: Kenzou Kassai, Osaka, Japan

[73] Assignee: Kassai Kabushikikaisha, Osaka, Japan

[21] Appl. No.: 400,748

[22] Filed: Jul. 22, 1982

[30] Foreign Application Priority Data

Aug. 11, 1981 [JP] Japan .............................. 56-126406

[51] Int. Cl.³ .................. A62B 35/00; B65H 75/48; F16D 63/00
[52] U.S. Cl. ........................ 242/107.4 B; 297/478; 280/806; 188/82.77
[58] Field of Search ............. 242/107.4 B; 297/478; 280/806; 188/135, 82.77, 136

[56] References Cited

U.S. PATENT DOCUMENTS

| | | | |
|---|---|---|---|
| 3,122,339 | 2/1964 | Whittingham | 242/107.4 B |
| 3,741,496 | 6/1973 | Beller | 242/107.4 B |
| 3,858,824 | 1/1975 | Stephensen | 242/107.4 B |

Primary Examiner—Stuart S. Levy
Assistant Examiner—Lloyd D. Doigan
Attorney, Agent, or Firm—W. G. Fasse; D. H. Kane, Jr.

[57] ABSTRACT

An emergency locking device equipped with a safety belt retractor wherein a reel (2) for winding a safety belt (1) thereon is rotatably mounted on a fixed reel support (4) with a shaft (3) fixed to the reel (2) being journaled on the support (4), and the reel (2) is biased to rotate in a belt rewinding direction by a return spring (5). In order to initiate the locking operation of the emergency locking device, there are provided a locking initiating member (21) fixedly mounted on the shaft (3) and an inertia plate (17) rotatably mounted on the shaft (3). The locking initiating member (21) is provided with a gear (21a) on its outer peripheral surface. A locking transmission pawl (19) is mounted rotatably about an axis (18) on the inertia plate (17). The locking transmission pawl (19) is provided with a gear (22) which is engaged with the gear (21a). The movement of the locking initiating member (21) is transmitted to the locking transmission pawl (19) by gears (21a, 22), the locking transmission pawl (19) is then engaged with one of a number of inner ratchet teeth (14) of a drum-shaped clutching wheel (12) whereby the rotation of the shaft (3) is transmitted to the clutching wheel (12), which moves a locking pawl (9) to engage a ratchet wheel (8) fixed to the reel (2), to prevent rotation of shaft (3) and thus the withdrawal of the safety belt (1).

5 Claims, 5 Drawing Figures

U.S. Patent  Feb. 14, 1984  4,431,145
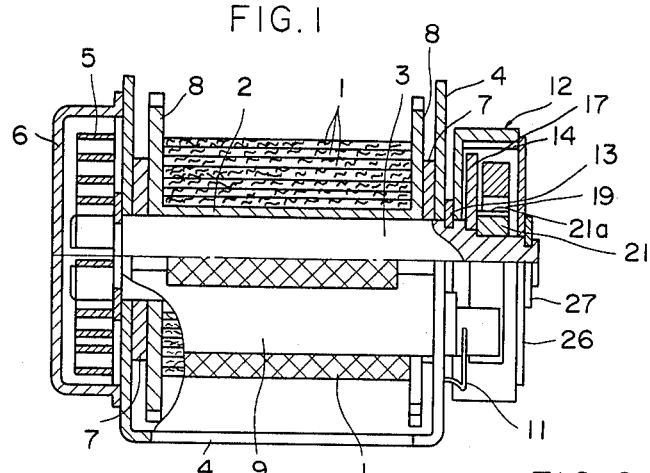
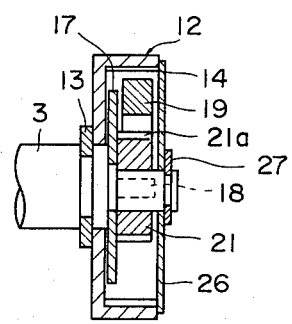
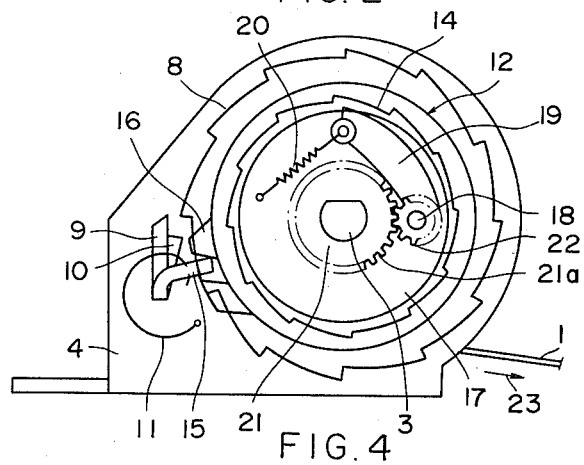
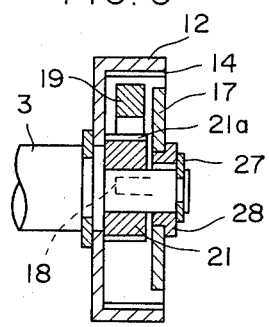
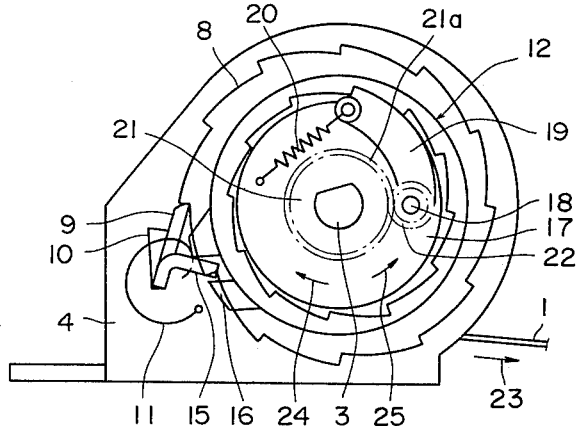

EMERGENCY LOCKING DEVICE FOR SAFETY BELT RETRACTOR

BACKGROUND OF THE INVENTION

1. Field of the Invention

This invention relates to emergency locking devices for a safety belt retractors, and more particularly to those emergency locking devices for preventing seat belts from being unwound in response to the sudden changes of the withdrawal forces arising in the seat belts wound by the safety belt retractors.

2. Description of the Prior Art

Emergency locking devices of the type disclosed herein have been advantageously used with seats equipped with safety belts in vehicles, aircraft or the like. More specifically, while under normal conditions free unwinding and rewinding of the seat belt with respect to a safety belt retractor are permitted in response to the change of the attitude of a seat occupant, in the event of an emergency, when the seat occupant is subjected to an unusual load, as during an accident, the withdrawal of the safety belt is locked to prevent the seat occupant from jumping out of the seat, whereby both comfort under normal conditions and safety in an emergency are satisfied.

Various structures of such emergency locking devices for safety belt retractors have been proposed. Particularly, it is necessary to keep the size of these emergency locking devices small because of space restrictions where they are installed. Therefore, it is preferable that an emergency locking device is improved by adding a few parts to the inherent structure of a safety belt retractor. Further, the requirement for miniaturization also means trying to make the structure simpler. The simpler the structure is, the fewer breakdowns occur, and thus the higher the safety becomes. Besides, the simpler structure may simplify operations for assembling such emergency locking device of a safety belt retractor.

SUMMARY OF THE INVENTION

Accordingly, it is a principal object of the present invention to provide an emergency locking device for safety belt retractors having a simple structure which brings about various advantages described above.

Generally, the present invention contemplates forcing a locking operation to be initiated by taking advantage of a transmission between a pair of gears and the inertia of an inertia plate to which one of the gears is attached. In summary, the present invention comprises an emergency locking device, equipped with a safety belt retractor wherein a reel for winding a safety belt thereon is rotatably mounted on a fixed reel support with a shaft fixed to the reel being journaled on the support, and the reel is biased to rotate in a belt rewinding direction by a return spring, comprising: a ratchet wheel fixed to the reel; a locking pawl mounted on the reel support so as to be movable between engaging and disengaging positions with respect to the ratchet wheel; a releasing spring urging the locking pawl toward a disengaging position from the ratchet wheel; a drum-shaped clutching wheel rotatably mounted on the shaft, the clutching wheel being provided with inner ratchet teeth on its inner peripheral surface and engaging projections on its outer peripheral surface, said engaging projections being engaged with said locking pawl; a locking initiating member fixedly mounted on said shaft, said locking initiating member having a gear on its outer peripheral surface; an inertia plate rotatably mounted on said shaft; a locking transmission pawl pivotally mounted about an axis on said inertia plate and having a gear engaged with the outer peripheral surface of said locking initiating member so as to be movable between engaging and disengaging positions with respect to one of said inner ratchet teeth according to the rotation of said locking initiating member with respect to said shaft; and a biasing spring urging said locking transmission pawl to be disengaged from said inner ratchet teeth.

According to the present invention, there is provided an emergency locking device for safety belt retractors which can advantageously operate by taking advantage of the transmission between the pair of gears and the inertia of the inertia plate to which one of the gears is attached. Further, the structure of the device is extremely simple and, therefore, this may contribute to enabling the emergency locking device to be compactly equipped with a safety belt retractor, and the device has advantages in terms of few breakdowns and simple operations for assembling it.

The above and other objects and features of the present invention will become more apparent from the following detailed description given with reference to the accompanying drawings.

BRIEF DESCRIPTION OF THE DRAWINGS

FIG. 1 is a front view showing an embodiment of the present invention, in section on the upper side thereof and partly in section on the lower side thereof, respectively;

FIG. 2 is a right-hand side view, schematically showing the constituent elements included in the emergency locking device portion of the safety belt retractor of FIG. 1, in an overlapping manner;

FIG. 3 is a front view, in section, showing a locking initiating portion of the safety belt retractor of FIG. 1;

FIG. 4 is a right-hand side view, schematically showing the constituent elements included in the emergency locking device portion of the safety belt retractor of FIG. 1, in an overlapping manner, but in a locking state; and FIG. 5 is a front view, in section, showing another embodiment of the present invention, corresponding to FIG. 3.

DESCRIPTION OF THE PREFERRED EMBODIMENTS

A safety belt 1 is wound on a reel 2. A shaft 3 is fixedly attached to the reel 2. The shaft 3 is journaled for rotation on a reel support 4. The reel support 4 comprises means for fixing the safety belt retractor to a suitable fixed position (not shown). A return spring 5 is connected to the left-hand end, in FIG. 1, of the shaft 3, whereby the reel 2 is constantly biased to rotate in the direction to rewind the safety belt 1. The return spring 5 is covered by a cover 6. Further, between the opposite ends of the reel 2 and the reel support 4, spacers 7 are disposed so that the reel 2 can be rotated in a position. With the arrangement described so far, the safety belt retractor attains an operation in which the safety belt 1 can be unwound and rewound smoothly in response to the change of the attitude of a seat occupant.

The arrangement of the emergency locking device which operates in the event of an emergency described above will now be described.

A ratchet wheel 8 is secured to the reel 2, for example, in the specific embodiment shown, on a flange portion as an integral part of the reel 2. The ratchet wheel 8 is provided with ratchet teeth at its outer periphery. A locking pawl 9 is arranged for cooperation with the ratchet wheel 8. The locking pawl 9 is supported by the reel support 4 at its opposite ends so as to be movable between engaging and disengaging positions with respect to the ratchet wheel 8. More specifically, the reel support 4 is provided with trapezoidal or fan-shaped mounting openings 10 for receiving the opposite ends of the locking pawl 9, which locking pawl 9 is movable within the range of the mounting openings 10, thereby to attain the conditions of engaging and disengaging with respect to the above described ratchet wheel 8. The locking pawl 9 is constantly urged toward a disengaging position from the ratchet wheel 8 by a releasing spring 11 connected between the locking pawl 9 and the reel support 4.

A drum-shaped clutching wheel 12 is rotatably mounted on the shaft 3. The clutching wheel 12 is held against axial displacement by a ring 13 in the axial direction of the shaft 3. The inner peripheral surface of the clutching wheel 12 is provided with inner ratchet teeth 14. Further, the outer peripheral surface of the clutching wheel 12 is provided with engaging projections 16 which are engaged with the bent portion 15 of the locking pawl 9. The engaging projections 16 form a recess for receiving the bent portion 15 of the locking pawl 9.

An inertia plate 17 is rotatably mounted on the shaft 3. The inertia plate 17 is preferably formed of metal having a relatively heavy weight and is received within the inner space of the clutching wheel 12. A locking transmission pawl 19 is pivotally mounted on an axis 18 on the inertia plate 17. The locking transmission pawl 19 is movable between engaging and disengaging positions with respect to one of the inner ratchet teeth 14 according to the rotation of the locking transmission pawl 19 about the axis 18. A biasing spring 20 is connected between the locking transmission pawl 19 and the inertia plate 17, whereby the locking transmission pawl 19 is constantly urged in the direction of disengagement from the inner ratchet teeth 14. The biasing spring 20 is not limited to a coil spring as shown. A torsion spring arranged about the axis 18 may be used in place of such a coil spring.

A locking initiating member 21 is fixedly mounted on the shaft 3. The locking initiating member 21 has a gear 21a on its outer peripheral surface. The locking transmission pawl 19 is provided with a gear 22 to be engaged with the gear 21a.

On the basis of the foregoing arrangement, the function and operation of the safety belt retractor as shown will be described with reference to the emergency locking device.

First, under normal conditions, while the safety belt 1 may be unwound in the direction of arrow 23 with some resistance as a result of the effect of the return spring 5, the safety belt 1 may be rewound under the force of the return spring 5 acting on the reel 2 when such withdrawal force is removed. In other words, the safety belt 1 is in the condition to be unwound or rewound smoothly in response to the change of the seat occupant's attitude. In this state, as is shown particularly in FIG. 2, the locking transmission pawl 19 is kept disengaged from the inner ratchet teeth 14. Accordingly, in response to the unwinding or rewinding operation of the safety belt 1, the shaft 3 is rotated and thus the locking initiating member 21 fixedly positioned on this is rotated. While this rotation is transmitted to the gear 22 through the gear 21a, the locking transmission pawl 19 is also moved in the direction of rotation within the clutching wheel 12, but in this normal condition, the locking transmission pawl 19 is never rotated in the direction to be engaged with the inner ratchet teeth 14 because the locking transmission pawl 19 is urged by the biasing spring 20 to be disengaged from the inner ratchet teeth 14. Accordingly, the inertia plate 17 is rotated about the shaft 13 following the locking transmission pawl 19. As a result, the rotation of the shaft 3 is not transmitted to the clutching wheel 12 and, therefore, the clutching wheel 12 remains stopped, the clutching wheel 12 cannot operate the locking pawl 9, the ratchet wheel 8 can be freely rotated, and consequently the withdrawal of the safety belt 1 in the direction of arrow 23 is not locked.

The operation in the event of an emergency will now be described. FIG. 4 is a right-hand side view, schematically showing the constituent elements included in the emergency locking device for the safety belt retractor of FIG. 1 and showing the locking state thereof. Now, it will be assumed that the safety belt 1 is extracted with the sudden change of acceleration. In response to this, the locking initiating member 21 is rotated with the shaft 3 in the same manner as described above. However, this rotation of the locking initiating member 21 is accompanied by a sudden change of acceleration. Therefore, the locking transmission pawl 19 and thus the inertia plate 17 cannot follow this sudden change of acceleration as in the normal situation described above. More specifically, the inertia plate 17 and the axis 18 fixedly positioned thereon tend to remain at the present position by their inertia and, therefore, this effect results in the relative rotation of the inertia plate 17 in the direction of arrow 24 with respect to the shaft 3. In this sense, it is preferable that the inertia plate 17 is formed of metal having a relatively heavy weight. By this relative rotation of the inertia plate 17 in the direction of arrow 24, the locking transmission pawl 19 is rotated about the axis 18 in the direction to be engaged with the inner ratchet teeth 14 against the effect of the biasing spring 20 through the transmission from the gear 21a to the gear 22. Therefore, the locking transmission pawl 19 is engaged with the nearest one of the inner ratchet teeth 14 during the rotation of the inertia plate 19 and thus the shaft 3 rotates in the direction of arrow 25. Then, when the shaft 3 is further rotated in the direction of arrow 25, the clutching wheel 12 is rotated in the direction of arrow 25 by the transmission through the inertia plate 17 and the locking transmission pawl 19. In response to this, one of the engaging projections 16 formed on the outer peripheral surface of the clutching wheel 12 makes the locking pawl 9 rotate within the mounting opening 9 in the clockwise direction in FIG. 4 against the resilience of the releasing spring 11. Consequently, the locking pawl 9 is moved in the direction for engaging with the ratchet wheel 8 and may be engaged by the nearest ratchet tooth of the ratchet wheel 8. This state is shown in FIG. 4, wherein the ratchet wheel 8 is fixed to the reel support 4 through the locking pawl 9 and, therefore, the reel 2 is secured and the withdrawal of the safety belt 1 in the direction of arrow 23 is prohibited.

When the above described emergency condition is released, the safety belt 1 is rewound on the reel 2 by the return spring 5. Further, the locking transmission pawl 19 has been disengaged from the inner ratchet teeth 14 by the biasing spring 20. Therefore, the locking pawl 9 will become disengaged from the ratchet wheel 8 by the effect of the releasing spring 11 with the clutching wheel 12 being slightly rotated. Consequently, the device returns to its normal position.

In addition, as shown in FIGS. 1 and 3, the operating elements, such as the locking transmission pawl 19 and the locking initiating member 21 and so on, are covered by a cover plate 26 which closes one end surface of the drum-shaped clutching wheel 12. The cover plate 26 is positioned on the shaft 3 by a ring 27. Another embodiment wherein the cover plate 26 is omitted and the inertia plate 17 supplies the place of the cover plate 26 may be considered. This will be described referring to FIG. 5.

FIG. 5 is a front view, in section, showing another embodiment of the present invention similar to FIG. 3. In FIG. 5, the same reference numerals are used for the portions corresponding to those in FIG. 3.

Referring to FIG. 5, the inertia plate 17 covers the open end of the drum-shaped clutching wheel 12, is rotatably supported on the shaft 3 through a bushing 28, and is positioned by the ring 27. The axis 18 is mounted on the inner side of the inertia plate 17 in a projected state. The relationship for positioning the locking transmission pawl 19, the locking initiating member 21 and so on is preserved in substantially the same state as shown in FIG. 3. Therefore, the function and operation of these elements are the same as those of FIG. 3 and, therefore, no explanation will be required.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An emergency locking device equipped with a safety belt retractor wherein a reel (2) for winding a safety belt (1) thereon is rotatably mounted on a fixed reel support (4) with a shaft (3) fixed to the reel (2) being journaled on the support (4), and the reel (2) is biased to rotate in a belt rewinding direction by a return spring (5), comprising:

a ratchet wheel (8) fixed to the reel (2);
a locking pawl (9) mounted on the reel support (4) so as to be movable between engaging and disengaging positions with respect to the ratchet wheel (8);
a releasing spring (11) urging the locking pawl (9) toward a disengaging position from the ratchet wheel (8);
a drum-shaped clutching wheel (12) rotatably mounted on the shaft (3), said clutching wheel (12) being provided with inner ratchet teeth (14) on its inner peripheral surface and engaging projections (16) on its outer peripheral surface, said engaging projections (16) being engaged with said locking pawl (9);
a locking initiating member (21) rotatably mounted on said shaft (3), said locking initiating member (21) being provided with a gear (21a) formed on its outer peripheral surface;
an inertia plate (17) rotatably mounted on said shaft (3);
a locking transmission pawl (19) pivotally mounted about an axis (18) on said inertia plate (17) and having a gear (22) engaged with the outer peripheral surface of said locking initiating member (21) so as to be movable between engaging and disengaging positions with respect to one of said inner ratchet teeth (14) according to the rotation of said inertia plate (17) with respect to said shaft (3); and
a biasing spring (20) urging said locking transmission pawl (19) to be disengaged from said inner ratchet teeth (14).

2. The device in accordance with claim 1, wherein said reel (2) comprises a flange portion as an integral part thereof, and said flange portion acts as said ratchet wheel (8).

3. The device in accordance with claim 1, wherein said locking initiating member (21), said inertia plate (17) and said locking transmission pawl (19) are received within a space surrounded by said drum-shaped clutching wheel (12).

4. The device in accordance with claim 3, wherein said drum-shaped clutching wheel (12) has an opening at one end surface thereof and which further comprises a cover plate (26) for closing said opening.

5. A device in accordance with claim 3, wherein said drum-shaped clutching wheel (12) has an opening at one end surface thereof, and said inertia plate (17) is positioned so as to close said opening.

* * * * *